Feb. 18, 1947.  B. C. BOEH  2,415,988
HAND TRUCK
Filed May 21, 1945
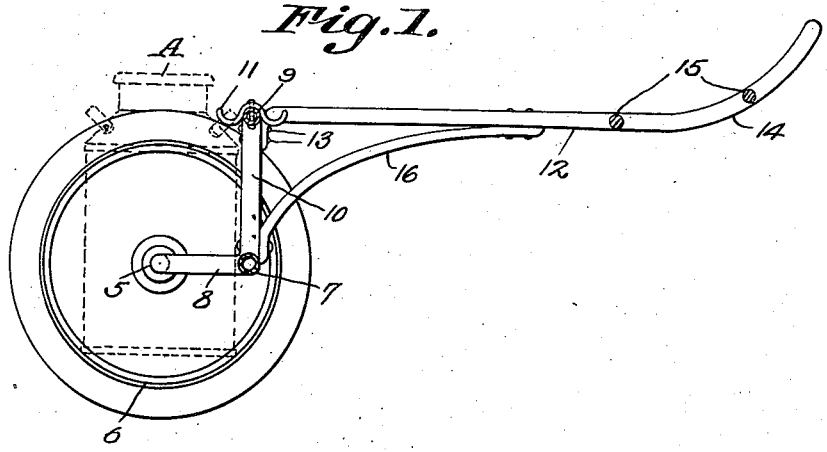
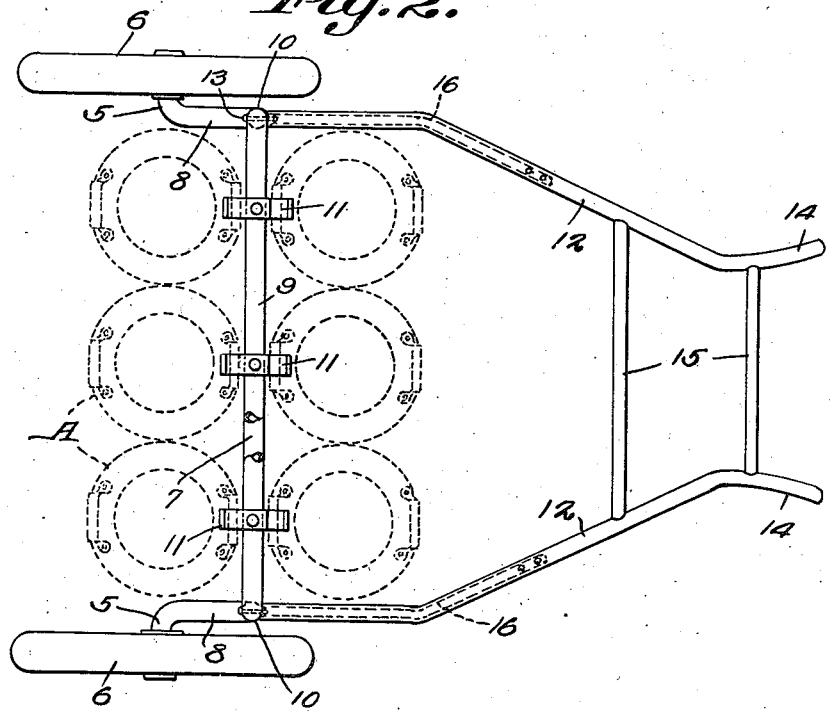
B. C. Boeh
INVENTOR.
BY
ATTORNEYS.

Patented Feb. 18, 1947

2,415,988

UNITED STATES PATENT OFFICE 2,415,988

HAND TRUCK

Bert C. Boeh, Caldwell, Idaho

Application May 21, 1945, Serial No. 594,919

1 Claim. (Cl. 214—65.4)

This invention relates to hand trucks, and more particularly to hand trucks of the two-wheeled type designed for use in supporting and transporting comparatively heavy loads, such as filled milk cans, milk pails or the like.

An important object of the invention is to provide a hand truck of this character, which may be moved to a position adjacent to the load, and the truck tilted forwardly so that the supporting hooks thereof will move under the handles of the cans, and when the truck is moved to its upright position, the cans will be elevated above the supporting surface, and the weight of the load supported by the wheels of the truck, for transportation.

Another important object of the invention is to provide a truck wherein the axle is constructed in such a way that loaded milk cans supported by the device, will be held in balance and will not tend to tilt forwardly, under the weight of the contents of the cans.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is a side elevational view of a truck constructed in accordance with the invention.

Figure 2 is a plan view thereof, the upper supporting bar of the truck being broken away, illustrating the axle of the truck which is disposed directly thereunder.

Referring to the drawing in detail, the truck assembly comprises outwardly extended axles 5 on which the wheels 6 of the truck are mounted.

The outwardly extended ends 5 form a part of the U-shaped axle 7, which has forwardly extended arms 8 which are spaced apart sufficiently to permit a plurality of milk cans indicated by the reference character A, to be supported therebetween.

The forward ends of the arms 8 terminate in a line drawn horizontally through cans supported on the truck, so that the weight of the contents of the cans will be maintained in balance and will not tend to tilt the truck forwardly, as in trucks now commonly used for moving milk cans.

The reference character 9 indicates a supporting member which may be in the form of a rod or pipe, the supporting member having downwardly extended ends 10 which are secured to the axle 7 adjacent to the inner ends of the forwardly extended arms 8.

Double-ended lifting hooks 11 are secured to the supporting member 9 and are arranged in spaced relation with respect to each other, the ends of the hooks being extended beyond the side of the supporting member, where they may hook into the lifting handles of milk cans, as clearly shown by Figure 1 of the drawing.

The handles of the truck are indicated by the reference character 12, and as shown, these handles are secured to the supporting member 9, by means of the bolts 13, the free ends of the handles being curved upwardly at 14, where they are spaced apart so that the person handling the truck, may walk between the curved ends of the handle and use his body in preventing lateral movement of the truck handle when being moved over a rough surface.

Brace rods 15 form a part of the handle and hold the sections of the handle in properly spaced relation with respect to each other.

In using the truck, the loaded milk cans are arranged so that the handles of the cans will be disposed in a direct horizontal line at one side thereof. The truck is now moved to a position against the cans, and the hooks are moved into engagement with the handles at one side of the cans, by tilting the truck forwardly. The handle of the truck is now depressed, and the milk cans together with their load, are lifted above the supporting surface. The truck may now be moved transporting the filled cans to a place of deposit.

Because the hooks of applicant's invention are double-ended, it will be obvious that the empty milk cans, which are relatively light, may be hooked on both ends of the hook members and a number of empty milk cans may be returned to the dairy for cleaning purposes.

As the cans are supported on the hooks 11, they swing to a position against the axle, and because the wheels are supported on the forward sections of the arms 8, or at a point in a horizontal line drawn centrally through the cans supported by the device, the cans will be held in balance and all tendency of the truck tilting rearwardly under the load, is eliminated.

It might be further stated that brace arms 16 connect the axle and handle, whereby downward pressure on the handle is directed to the main axle 7.

What is claimed is:

A hand truck comprising a main axle section having forwardly extended arms, the free ends of the arms being extended laterally providing axles, a supporting bar connected with the main axle and being disposed in parallel spaced relation with respect to the main axle, hooks mounted on the supporting bar and extending forwardly and rearwardly therefrom, said hooks adapted to engage into handles of milk cans, supporting the milk cans in spaced relation with the surface on which the truck is mounted, the milk cans positioned on the truck adapted to swing into engagement with the main axle, supporting the cans in upright positions, and a handle connected with the supporting bar and axle, whereby the truck may be operated.

BERT C. BOEH.

REFERENCES CITED

The following references are of record in the file of this patent:

UNITED STATES PATENTS

| Number | Name | Date |
|---|---|---|
| 2,081,504 | Quick | May 25, 1937 |
| 1,717,377 | Forry | June 18, 1929 |
| 2,059,445 | Eastman | Nov. 3, 1936 |
| 2,396,325 | Jimenez | Mar. 12, 1946 |

FOREIGN PATENTS

| Number | Country | Date |
|---|---|---|
| 13,107 | Dutch | Sept. 15, 1926 |